July 6, 1965     J. M. McDONOUGH ETAL     3,193,352
PROCESS FOR THE PURIFICATION OF LITHIUM HYDROXIDE
Filed Aug. 29, 1961
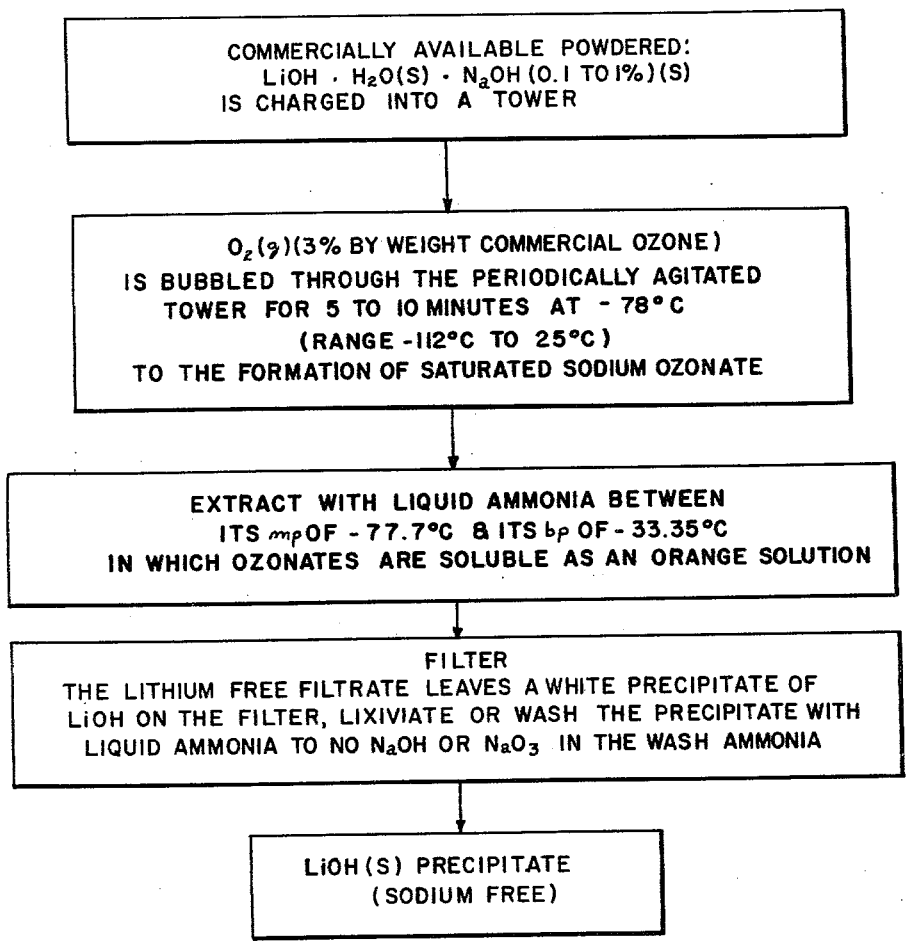
INVENTORS
JOHN M. MC DONOUGH
MORTON J. KLEIN
BY
ATTORNEYS

United States Patent Office 3,193,352
Patented July 6, 1965

3,193,352
PROCESS FOR THE PURIFICATION OF LITHIUM HYDROXIDE
John M. McDonough, Oak Lawn, and Morton J. Klein, Chicago, Ill., assignors to the United States of America as represented by the Secretary of the Air Force
Filed Aug. 29, 1961, Ser. No. 136,397
4 Claims. (Cl. 23—184)

This invention relates to a process for the production of sodium-free lithium hydroxide.

The metal lithium occurs in nature as a lithium mica of the composition $KLi[Al(OH,F)_2]Al(SiO_3)_3$ and is mined as the ore spodumene.

The recovery of lithium from the ore spodumene as lithium sulfate, carbonate, hydroxide or the like, is described in the Patents: 2,801,153, T. E. Dwyer, July 30, 1957; 2,662,809, A. V. Kroll, December 15, 1953; and 2,413,644, C. M. Nicholson, December 31, 1946.

The Patent 935,880 issued to E. Zell on October 5, 1909, describes a process for making pure lithium hydroxide $LiOH.H_2O$ in a water solution. The Patent 2,629,652 issued February 24, 1953, to W. H. Schechter and E. D. Osgood describes the making of anhydrous lithium hydroxide.

The object of this invention is to provide a new and improved process or method for preparing sodium-free lithium hydroxide.

Another object is to pass ozone through a bed of lithium hydroxide that is contaminated with sodium hydroxide to form sodium ozonate and to lixiviate the sodium ozonate out of the bed by passing liquid ammonia through the bed.

Another object is to provide an economical and a convenient process for separating lithium and sodium in the production of sodium-free lithium hydroxide.

A process flow sheet that embodies the present invention is shown in the accompanying drawing.

The process for separating lithium and sodium in the production of sodium-free lithium hydroxide that is disclosed herein begins with commercially available lithium hydroxide that contains up to about 1% by weight of sodium hydroxide.

The commercial lithium hydroxide is a white crystalline powder of the tetragonal system and of the composition $LiOH.H_2O$. The commercial lithium hydroxide is charged into a column or tower equipped for being agitated.

The temperature of the bed of lithium hydroxide in the column is maintained below the lithium hydroxide product decomposition temperature of 25° C. and above the slow reaction lower temperature of —112° C., with an optimum temperature of about —78° C.

Commercial ozone of by weight 3% ozone is gaseous oxygen is passed through the bed for from 5 to 10 minutes as the bed is periodically agitated to the substantially complete conversion of all of the sodium content of the charge into sodium ozonate of the composition $NaO_3$.

The bed is then extracted with liquid ammonia that melts at —77.7° C. and that boils at —33.35 C. The liquid ammonia removes the $NaO_3$ that has been formed by the ozone as an orange colored solution of sodium ozonate $NaO_3$ in liquid ammonia.

The bed is then white lithium hydroxide that on being washed with liquid ammonia, is completely free from sodium.

The absence of lithium from the orange colored ammonia solution of sodium ozonate is confirmed by the use of the flame photometer that detects one part of lithium in one million parts of the solution. This confirms the presence in the solution of no lithium ozonate.

The described method removes sodium from lithium hydroxide by a process that is convenient and economical since the liquid ammonia that is used for the extraction is recovered and is recycled through the process. The only reagent that is consumed in the process is the commercially supplied 3% by weight ozone in oxygen.

Experimentally the relative data on experimental apparatus that is successfully used in the described process is a glass column that is 1 inch in diameter and that is packed with a bed about 2½ inches deep of lithium hydroxide of the composition $LiOH.H_2O$. The lower temperatures are preferred in the extraction process since the heat evolved at 25° C. tends to decompose the lithium hydroxide product before it can be extracted. At the lowest extreme of the temperature range of from 25 to —112° C. the reaction is slow. If desired, lithium hydroxide is converted to lithium by a reduction reaction.

The pressure of one atmosphere laboratory conditions may be replaced by partial vacuum pressures that speed up filter operations, as is common practice in filtration work, without departing from the scope of the present invention.

It is to be understood that the process that is disclosed herein is subject to modifications and changes in reagents and conditions that accomplish comparable results, without departing from the spirit and scope of the present invention.

We claim:

1. The extraction process of purifying lithium hydroxide that is contaminated by the presence of sodium hydroxide by reacting the sodium hydroxide with a mixture of oxygen and ozone containing about 3% ozone by weight to form sodium ozonate; dissolving the sodium ozonate in liquid ammonia; and successively washing the lithium hydroxide with liquid ammonia until the lithium hydroxide is free from sodium ozonate.

2. The process for the purification of a bed of lithium hydroxide containing water of crystallization and contaminated by the presence of sodium hydroxide, positioned in a tower equipped for being agitated and maintained within the temperature range of below 25° C. and above —112° C., passing through the bed of lithium hydroxide a commercial ozone of by weight 3% ozone in gaseous oxygen for a time of from 5 to 10 minutes as the bed is periodically agitated for the substantially complete conversion of all of the sodium content of the bed into sodium ozonate of the composition $NaO_3$; extracting the bed with liquid ammonia for removing the $NaO_3$ that has been formed by the ozone as an orange-colored solution of sodium ozonate in liquid ammonia; and washing the lithium hydroxide with liquid ammonia until the lithium hydroxide is completely free from sodium.

3. The process for the purification of a bed of lithium hydroxide contaminated with sodium hydroxide in a tower that is equipped for being agitated and that is maintained within the temperature range of from —112° C. to 25° C.; passing through the bed of lithium hydroxide a mixture of by weight 3% ozone in oxygen for a time of from 5 to 10 minutes as the bed is agitated to the substantially complete conversion of all of its sodium content into sodium ozonate; extracting the bed with liquid ammonia for removing the sodium ozonate as an orange-colored solution; and washing the lithium hydroxide with liquid ammonia until the lithium hydroxide is free from sodium.

4. The process for the purification of a bed of lithium hydroxide that contains sodium hydroxide as a contaminant and that is positioned in a tower that is equipped for being agitated and that is maintained around an optimum temperature of about $-78°$ C.; passing through the contaminated bed of lithium hydroxide a mixture of oxygen that contains by weight about 3% ozone, for a time duration of about 5 to 10 minutes as the bed is agitated, to the complete conversion of all of the sodium hydroxide content of the charge into sodium ozonate; extracting the bed with liquid ammonia for removing the sodium ozonate as an orange-colored solution of sodium ozonate in liquid ammonia; and washing the lithium hydroxide free of sodium ozonate.

No references cited.

MAURICE A. BRINDISI, *Primary Examiner*.
CARL D. QUARFORTH, *Examiner*.